Jan. 25, 1966 O. E. LARSEN 3,231,655
PRODUCTION OF LARGE SLABS OF PLASTIC
Filed Oct. 17, 1960 2 Sheets-Sheet 1

INVENTOR.
O. E. LARSEN
BY Hudson & Young
ATTORNEYS

Jan. 25, 1966  O. E. LARSEN  3,231,655
PRODUCTION OF LARGE SLABS OF PLASTIC
Filed Oct. 17, 1960  2 Sheets-Sheet 2

*INVENTOR.*
O.E. LARSEN

BY Hudson & Young

*ATTORNEYS*

3,231,655
PRODUCTION OF LARGE SLABS OF PLASTIC
Olaf E. Larsen, Bartlesville, Okla., assignor to Phillips
Petroleum Company, a corporation of Delaware
Filed Oct. 17, 1960, Ser. No. 63,146
7 Claims. (Cl. 264—308)

This invention relates to an apparatus and a method for making large, void-free slabs of plastic. In one aspect, it relates to apparatus and method for making large, void-free slabs of thermoplastic material. In another aspect, it relates to apparatus and method for making large slabs of polyethylene.

At the present time, large slabs of plastic materials are not obtainable, for one or more of several reasons. For example, in the past there has not been particular use for materials of such size. Furthermore, large slabs of plastic are difficult but not impossible to manufacture. High density polyethylenes are a specific class of plastic materials which as yet have not been fabricated into large slabs. By the term, "large slabs," is meant solid bodies of the plastic material of such size which cannot be fabricated by conventional extrusion methods. As an example of a slab of a polyethylene which is termed a "large slab" is one which is, for example, 4 feet thick, 6 feet wide and 20 feet in length. Obviously, slabs which would satisfy the description of a large slab can be of other dimensions than those given as an illustration.

One of the main difficulties in producing large slabs of plastic materials is the voids and areas of high internal stresses which are formed when large, molten plastic masses solidify.

An object of this invention is to provide apparatus and a method for producing large slabs of plastic material. Another object of this invention is to provide apparatus and a method for producing large slabs of plastic materials which are free of voids and areas of high internal stresses. Still another object of this invention is to provide apparatus and a method for producing large slabs relatively rapidly. Still other objects and advantages will be realized upon reading the following description which taken with the attached drawing forms a part of this specification.

According to this invention, it is proposed to produce such large slabs by solidifying the mass in small increments added by a combination lamination and welding process.

Figure 1:
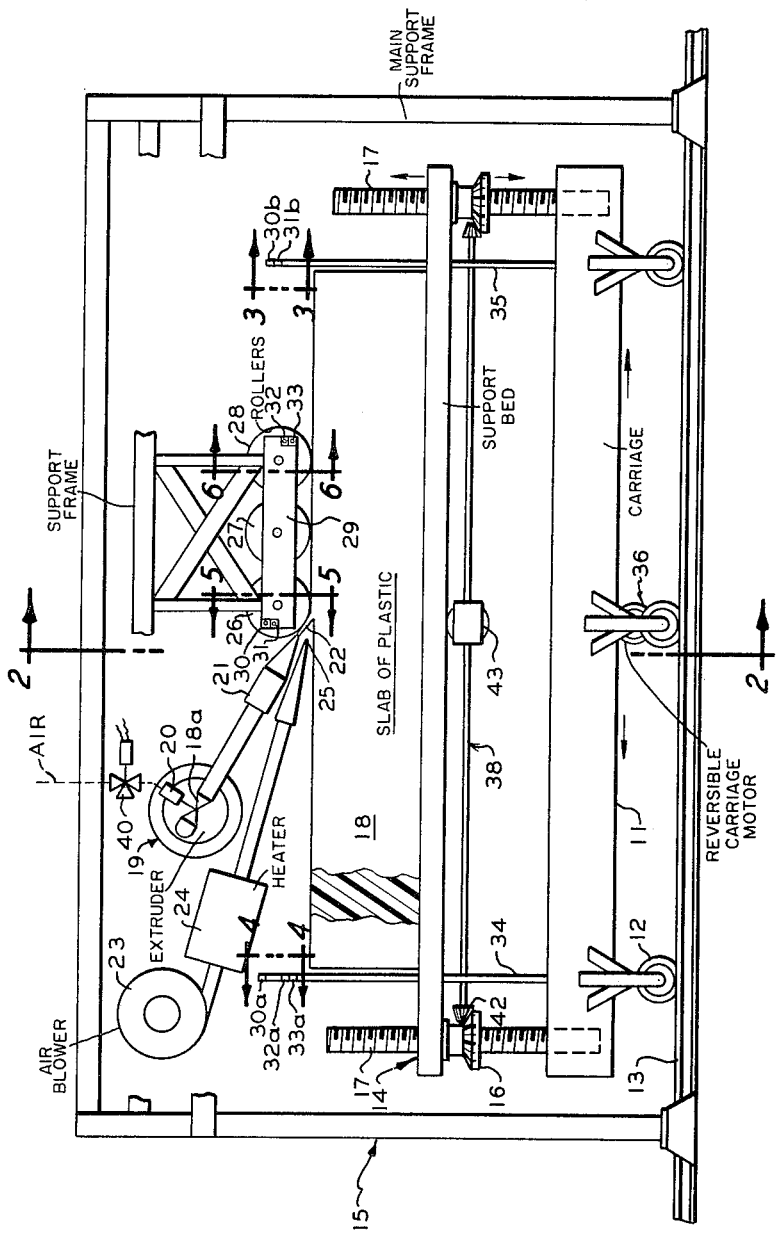
Figure 2:
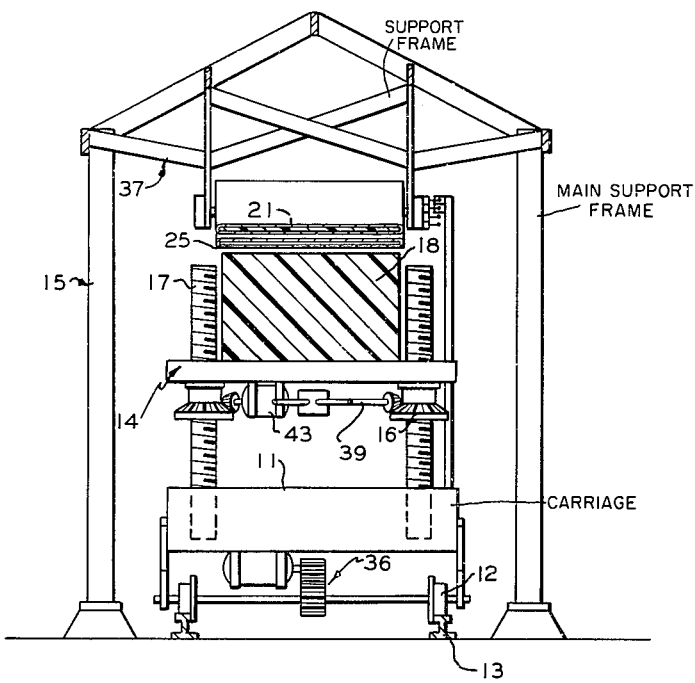
Figure 4:
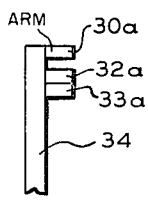
Figure 3:
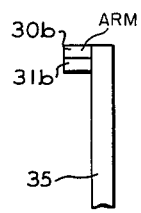
Figure 5:
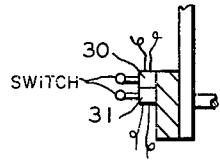
Figure 6:
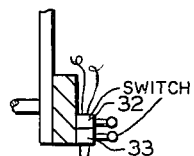

In the drawing, FIGURE 1 is an elevational view, with parts broken away, showing an arrangement of apparatus parts suitable for producing large slabs of plastic material. FIGURE 2 is a sectional view taken on the line 2—2 of FIGURE 1. FIGURE 3 is a view taken on the line 3—3 of FIGURE 1. FIGURE 4 is a view taken on the line 4—4 of FIGURE 1. FIGURE 5 is a sectional view of a portion of the apparatus taken on the line 5—5 of FIGURE 1. FIGURE 6 is a sectional view of a portion of the apparatus taken on the line 6—6 of FIGURE 1.

The method and apparatus herein disclosed are particularly adapted for the production of large slabs of a polyethylene such as disclosed and claimed in U.S. Patent 2,825,721, of Hogan and Banks. On reference to FIGURES 1 and 2 of the drawing, reference numeral 11 identifies a support carriage provided with wheels 12 for longitudinal movement on a track 13. Above carriage 11 is provided a vertically movable support bed 14. This support bed is supported at its corners by four large screws 17. These four screws are provided with threads of the same pitch so that as the bed rises or lowers, it will still be maintained in a strictly level position. Reference numeral 38 identifies a support bed elevating and lowering apparatus. This apparatus comprises large threaded nuts 16 one of which is disposed around each of the screws 17 on the underside of the support bed. Upon rotating these large nuts, the bed rises or falls depending upon the direction in which the nuts are rotated. This raising and lowering apparatus 38 is provided with rods 39 which are provided with gears 42 on their ends in such a manner that all of the nuts are rotated in the same direction. A motor assembly 43 provides motive power for rotation of rods 39 and movement of bed 14. When the support bed 14 has been lowered sufficiently that the slab of plastic has acquired its proper thickness, then upon removal of the slab of plastic, the elevating or lowering apparatus can be operated to elevate the bed to such a height that another slab of plastic can be started on the bed.

Reference numeral 36 identifies a reverseible carriage motor assembly which is so constructed that when the carriage is at one end of its extent of travel and upon closing of the proper switch, the motor operates to move the carriage to the other end of the track 13. And when the carriage reaches this end of its movement, a switch is actuated to reverse the current to the drive motor of assembly 36 and the carriage will move in the opposite direction.

In FIGURES 1 and 2, reference numeral 18 identifies a slab of plastic in the process of production. This slab is being fabricated by extruding a sheet or web of plastic through a sheeting die 21. This sheeting die is made of such width as to extrude a web of the proper width for the production of the slab of desired size. In some cases, the sheeting die extrudes a sheet or web of plastic approximately ¼ inch in thickness and, for example, 6 feet in width. An extruder apparatus 19 extrudes the plastic through a valve 18a and through the sheeting die 21 for producing such a web. In order to cause a newly extruded web to adhere tightly without voids and without internal stresses a blower 23 provides a current of air passing through a heater 24 to a hot air spreader 25. This hot air spreader is of the same width as the sheeting die so that the surface across the width of the slab 18 can be heated just before a newly extruded section of web is extruded. Upon extrusion of the web and while still molten and soft, it is pressed against the heated and substantially molten surface of the slab 18. This pressing is achieved by passage of rollers 26, 27 and 28 over the newly extruded web. These rollers are cooled so that upon pressing or bonding the hot and plastic newly extruded web against the hot surface of slab 18 the newly bonded web is cooled so that it will solidify and will not be distorted in shape in any manner. The newly extruded section of web prior to its bonding to slab 18 is identified by reference numeral 22.

Rollers 26, 27 and 28 are supported by a roller support 29 provided at each end of the several rollers. These supports are provided with bearings for supporting the ends of a shaft or other type of journal extending outward from each end of the several rollers. The rollers and their roller supports are supported by a support frame 37 suspended from the upper portion of the main support frame 15.

Since the rollers, the extrusion or sheeting die apparatus and also the blower, heater and hot air spreader are all rigidly supported by the main apparatus frame or otherwise in a fully immovable position, the portion of the apparatus which does the moving is the support carriage 11 with its load. As illustrated in FIGURE 1, when the support carriage 11 with support bed and slab 18 moves to the right end of its extent of movement, the left hand end of slab 18 is just free, that is, has just moved to the right of roller 28. Upon observing carefully FIGURE 1, it is realized that as the slab moves from left to right, hot air spreader 25 first heats the surface of the slab immediately after which web 22 is extruded and laid upon the heated surface. Immediately following extrusion of the web, the first roller 26 presses the hot web 22 against the heated upper surface of the slab. Upon further movement of carriage 11 to the right, the second roller 27 and finally the third roller 28 continues the pressing and bonding of the web 22 against the upper surface of the slab and a firm and void-free bond is obtained. After the third roller has passed, the newly added web is firmly bound to the upper surface of the previously constructed slab. When the left hand end of the slab has just moved to the right of the bottom of the third roller 28, arm 30a supported on a support arm 34 throws a switch 32 which opens the three-way solenoid valve 40 which admits air from a source, not shown, to an air cylinder 20 which in turn closes a valve 18a to shut off the extrusion of web 22. If desired, after closing of valve 18a, web 22 can be cut by hand at left hand end of slab 18 or a mechanical apparatus can be provided for trimming the slab at this point.

The web is cut either by hand or by mechanical cutter as desired. The support carriage 11 continues to move to the right so that roller 27 and roller 28 exercise their functions of further pressing the newly extruded web 22 to the upper surface of the slab 18. As the last of the three rollers, that is, roller 28, reaches the left hand end of slab 18, arm 32a throws switch 32 which is a reversing switch and this switch closes an electrical circuit to the reversible carriage motor assembly 36 and the entire carriage, bed and slab move toward the left. At the time the arm 32a throws switch 32, another arm 32a throws switch 33 which closes the circuit to the motor 43 which rotates rod 39 through a sufficient number of degrees that the support bed 14 is lowered an extent equivalent to the thickness of the web 22 which the apparatus is designed to extrude. Upon lowering of the bed and slab and movement of the carriage to the left, arm 30b contacts the two-way switch 30 which opens the circuit to the solenoid valve 40 which in turn exhausts air pressure from the air cylinder 20 thereby allowing valve 18a to open and extrusion of an additional web is begun. At the same time that arm 30b throws switch 30, another arm 31b throws switch 31 which reverses the reversible motor assembly 36 to start movement of the carriage from left to right so that the newly extruded web can be laid upon the upper surface of the previously produced web.

It will be seen from the above description that a slab 18 of any desired thickness can be produced merely by making provision as regards the length of the screws and the general construction of the equipment so that the movable support bed can be lowered such a distance as desired for the thickness of the slab to be constructed. FIGURES 4 and 3 respectively, illustrate in detail the general construction of the arm supports 34 and 35 with their arms 30a, 32a, and 33a, and arms 30b and 31b. FIGURES 5 and 6 illustrate in more detail the relative positioning of switches 30 and 31, and switches 32 and 33. FIGURE 5 illustrates switches 30 and 31 on the left hand end of the roller support 29 while the switches 32 and 33 illustrated in FIGURE 6 are mounted at the right hand end of the roller support 29.

As an illustration of the production of a large slab of polyethylene plastic as herein intended, the web 22 has a thickness of approximately ¼ inch and a width of about 6 feet. The length of the carriage is such that a slab of this width is made having a length of 20 feet. The length of the screws 17 are such that a slab of vertical dimension of 4 feet is produced. Such a slab is then 4 feet thick, 6 feet in width and 20 feet in length. The temperature of the extruding web is 350° F. and the first roll is maintained at a temperature of about 247° F., the second roll at a temperature of about 220° F. and the third roll at a temperature of about 180° F. If desired, the temperatures of these three rolls can be maintained by providing a positive and separate control for each roll. Or, if desired, since the rolls are hollow rolls provided for circulation of the coolant therethrough, the several rolls can be connected in series so as to provide countercurrent flow of coolant therethrough. If countercurrent coolant flow is provided for, then rate of flow should be such as to give approximately the several temperature hereinabove given for the several rolls. The slab as herein specified is produced at rate 1½ feet per minute, that is( the speed with which the support carriage 11 moves during extrusion of the web 22.

When extruding web 22 of ¼ inch thickness at 350° F., a 4½ inch conventional screw extruder is used and extrudes the polyethylene plastic at a rate of 350 pounds per hour. When extruding this ¼ inch web the air temperature for softening the upper surface of the previously extruded web is maintained at about 350° F.

While it has been stated that a screw extruder is used, it is realized that any type of conventional extruder suitable for production of the slab as required herein can be used.

Such large slabs as herein disclosed, particularly high density polyethylene slabs are used in shielding in atomic reactors.

The adhesion or bonding of a freshly extruded web to the heated surface of a previously extruded web is herein termed adhesion, adhering, bonding, pressure bonding, welding, or pressure welding. All these terms are intended to convey the meaning that a newly extruded web becomes an integral part of the slab in such a manner that the finished slab is clearly a single body of plastic without voids.

While certain embodiments of the invention have been described for illustrative purposes, the invention obviously is not limited thereto.

What is claimed is:
1. A process for producing thick slabs of an extrudable thermoplastic material which comprises the steps of:
   (1) heating to its softening temperature a complete broad surface of a first sheet of said material with a stream of hot air beginning along an entire edge thereof and progressively moving the heating zone over the entire surface to the opposite edge;
   (2) simultaneously and progressively extruding a second sheet of said material in molten form onto said surface immediately following said heating zone so as to cover said surface with said sheet;
   (3) simultaneously and progressively cooling and pressing said sheet onto said surface immediately following the contacting of said sheet with said surface so as to fuse same to said surface; and
   (4) applying successive sheets of said material to the exposed surface of the last applied sheet by repeating steps (1), (2), and (3) so as to build up said slab.
2. The process of claim 1 wherein said material is polyethylene.
3. Apparatus for forming thick thermoplastic slabs comprising in combination:
   (1) a support carriage of rectangular plan movable reciprocally along an axis thereof;
   (2) means for reciprocating said carraige thru a path substantially the length of the slab to be produced;
   (3) a flat rectangular bed for supporting said slab opposite said carriage;
   (4) an assembly on said carriage movable therewith for supporting said bed and moving same toward and away from said carriage in parallel relation thereto;
   (5) fixed means opposite said bed for directing a stream of hot air onto a narrow section of said slab extending from edge to edge thereof;
   (6) fixed means for extruding a sheet of molten thermoplastic material immediately adjacent means (5) and coextensive with said slab; and

(7) fixed means for pressing and cooling said sheet immediately adjacent means (6).

4. The apparatus of claim 3 wherein means (2) comprises rails underneath said carrier, wheels on said carrier engaging said rails, a reversible electric carriage motor on said carriage for driving same, a fixed reversible switch for reversing current thru said motor, and switch reversing elements attached to opposite ends of said carriage in line with said switch.

5. The apparatus of claim 3 wherein the assembly (4) comprises threaded rods extending upright thru the corners of said bed, a threaded gear element on each said rod subjacent said bed for supporting same, and means for simultaneously rotating said gear elements in either direction.

6. The apparatus of claim 3 wherein the fixed means of (7) comprise at least one roller having means for cooling same.

7. The apparatus of claim 3 including a fixed frame above said bed to which elements (5), (6), and (7) are attached.

References Cited by the Examiner

UNITED STATES PATENTS

| | | | |
|---|---|---|---|
| 2,206,492 | 7/1940 | Westenberger et al. | 51—92 |
| 2,917,874 | 12/1959 | Lierse | 51—92 |
| 2,932,323 | 4/1960 | Aries | 138—55 |
| 2,943,349 | 7/1960 | Adams et al. | 18—5 |
| 2,956,723 | 10/1960 | Tritsch | 229—48 |
| 2,960,425 | 11/1960 | Sherman | 154—116 |
| 3,045,285 | 7/1962 | Baird et al. | 18—48 |

EARL M. BERGERT, *Primary Examiner.*

CARL F. KRAFFT, ALEXANDER WYMAN,
*Examiners.*